(12) United States Patent
Gou et al.

(10) Patent No.: US 8,106,898 B2
(45) Date of Patent: Jan. 31, 2012

(54) METHOD AND APPARATUS FOR COMPENSATION FOR SKEW IN VIDEO SIGNALS

(75) Inventors: Yun-Song Gou, Richmond (CA);
Hong-Tao Wen, Richmond (CA);
Qian-Qi Zhuang, Richmond (CA)

(73) Assignee: Aten International Co., Ltd., Shijr (TW)

( * ) Notice: Subject to any disclaimer, the term of this patent is extended or adjusted under 35 U.S.C. 154(b) by 494 days.

(21) Appl. No.: 12/409,427

(22) Filed: Mar. 23, 2009

(65) Prior Publication Data
US 2010/0238297 A1   Sep. 23, 2010

(51) Int. Cl.
*G06F 3/038* (2006.01)

(52) U.S. Cl. ........................................ 345/204

(58) Field of Classification Search ............... 345/204, 345/213, 690, 691, 88; 348/790, 502; 327/161; 331/167; 709/238; 439/894
See application file for complete search history.

(56) References Cited

U.S. PATENT DOCUMENTS

| | | | |
|---|---|---|---|
| 2,930,842 A * | 3/1960 | Leyton | 348/502 |
| 5,159,275 A | 10/1992 | Fujimura | |
| 7,113,012 B2 | 9/2006 | Amin | |
| 7,277,104 B2 | 10/2007 | Dickens et al. | |
| 7,551,168 B2 * | 6/2009 | Ahern et al. | 345/204 |
| 7,683,896 B2 * | 3/2010 | Odryna et al. | 345/204 |
| 2002/0005841 A1 * | 1/2002 | Jung et al. | 345/204 |
| 2005/0132087 A1 | 6/2005 | Glinski et al. | |
| 2005/0165994 A1 * | 7/2005 | Dickens | 710/305 |
| 2006/0116030 A1 | 6/2006 | Niiyama et al. | |
| 2007/0024604 A1 * | 2/2007 | Jang et al. | 345/204 |
| 2007/0132661 A1 * | 6/2007 | Shen et al. | 345/3.4 |
| 2007/0146354 A1 * | 6/2007 | Kubota et al. | 345/204 |
| 2007/0200840 A1 * | 8/2007 | Clynes et al. | 345/204 |
| 2008/0111643 A1 | 5/2008 | Shen | |
| 2008/0192031 A1 * | 8/2008 | An et al. | 345/204 |
| 2009/0058836 A1 * | 3/2009 | Kang et al. | 345/204 |
| 2009/0060046 A1 * | 3/2009 | Cole | 375/240.21 |
| 2010/0085492 A1 * | 4/2010 | Shiomi | 348/790 |
| 2010/0090937 A1 * | 4/2010 | Cheng et al. | 345/88 |
| 2010/0103200 A1 * | 4/2010 | Langendijk | 345/690 |
| 2010/0214201 A1 * | 8/2010 | Chen et al. | 345/88 |

FOREIGN PATENT DOCUMENTS

| | | |
|---|---|---|
| TW | 200641618 | 12/2006 |
| TW | 200641619 | 12/2006 |
| TW | 200729947 | 8/2007 |

* cited by examiner

OTHER PUBLICATIONS

Video Electronics Standards Association, "VESA and Industry Standards and Guidelines for Computer Display Monitor Timing Version 1.0, Revision 0.8", Sep. 17, 1998, Milpitas, CA.

*Primary Examiner* — Fred Tzeng
(74) *Attorney, Agent, or Firm* — Chen Yoshimura LLP

(57) ABSTRACT

A system for compensating for skew in a color video signal transmitted by a cable having multiple conductors is described. A test pulse signal (e.g. a 2 MHz signal) is inserted into the color components (e.g. RGB) of the video signal during time periods in each frame when the RGB video signals are inactive, such as within 300 μs after the V sync signal. After transmission over the cable, the RGB components with the inserted test signal are delayed relative to each other using a delay line in cooperation with a control circuit. The delay line generates detect signals by detecting relative delays of the test signal pulses inserted in the RGB components. The control circuit controls the amount of delay in the delay line based on the detect signals, so that the RGB components in the video signal outputted by the delay line are synchronized.

21 Claims, 6 Drawing Sheets

METHOD AND APPARATUS FOR COMPENSATION FOR SKEW IN VIDEO SIGNALS

BACKGROUND OF THE INVENTION

1. Field of the Invention

This invention relates to video signal compensation, and in particular, it relates to circuitry and related methods for detecting and compensating for color separation in video signals transmitted over a cable with multiple transmission wires.

2. Description of the Related Art

In various systems, such as computer systems, where analog color video signals from a video source such as a computer is transmitted over relatively long transmission lines having multiple conductor lines such as a category 5 (Cat 5) cable, to a remote display device such as a monitor, the color components such as RG B components of the video signal often become slightly delayed relative to each other when they arrive at the display device. This is sometimes referred to as skew, and is typically caused by the slight length difference of the conductor wires in the cable that carry the different color components of the video signal. As a result, the color images displayed on the remote display device exhibit image degradation effects such as color separation.

Many technologies have been described for compensating for such skew. In one example, U.S. Pat. No. 7,113,012 describes a skew delay compensator which uses (as shown in its FIG. 3) a number of adjustable delay lines (DL1, DL2, DL3) connected to communication interfaces at the downstream end of the transmission conductors (3001, 3002, 3003). Connected to the delay lines are a detecting means (DD) for measuring propagation delay indicative parameters of the conductors, and a microprocessor (MP) for automatic adjustment of at least one adjustable delay line on the basis of said measured propagation delay indicative parameters so that the mutual delay between the conductors is minimized. A test oscillator 305 is provided at the upstream end of the conductors to generate a fully synchronized fixed frequency test signal. At the start of a calibration process, the test oscillator is activated to provide the test signal at the upstream end of the conductors, and the delay lines at the downstream end are adjusted so that the mutual delay in the test signals are minimized. The settings of the delay lines are stored in a memory, and the calibration process ends. Thereafter, the stored delay line settings are used to perform compensation for the RGB video signals.

In another example, U.S. Pat. Appl. Pub. 2008/0111643 (commonly owned as the present application) describes a signal delay compensation circuit (see its FIG. 1) which uses variable delay lines 114, a phase detector 118 and a controller 120 at the downstream end of the cable 106 to perform signal compensation. At the upstream end of the cable, an oscillator 112 generates an oscillation signal, and multiplexers 122 selects either the analog video signals or the oscillation signals to input into the transmission lines of the cable. During normal operation, the multiplexers select the analog video signals, and during a signal compensation process (which occurs at the beginning of the communication or when the user instructs to optimize the signal synchronization), the multiplexers select the oscillation signals to be inputted to the cable. The variable delay lines are adjusted during the signal compensation process and then used during normal operation to perform skew compensation.

In another example, U.S. Pat. No. 7,277,104 describes a device for reducing and determining the skew between color video signals transmitted over at least two different video cables. Skew detection circuits, each including a pulse separation detecting circuit and a pulse phase detecting circuit, are provided in the remote unit to measure the skew. To perform a skew compensation test, the video display is blanked, and detection signals, which include delay signals and phase signals, are applied to determine skew compensation. The video signal is reconnected afterwards. Another example, U.S. Pat. Appl. Pub. No. 2005/0132087, is similar in that the normal video signal transmission is interrupted in order to perform skew detection and compensation.

SUMMARY OF THE INVENTION

In the systems described above, skew testing and compensation interferes with normal video signal transmission.

Accordingly, the present invention is directed to a skew compensation method and apparatus that substantially obviates one or more of the problems due to limitations and disadvantages of the related art.

An object of the present invention is to perform skew detection and compensation without interfering with normal video signal transmission.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a video signal skew detection and compensation system, which includes a transmission-side circuit and a receiving side circuit coupled to a transmission cable system. The transmission-side circuit includes a test signal generating circuit for generating a test signal; a switching circuit receiving the test signal and receiving an input video signal from a video source, the input video signal including at least two color components, each color component including an active period within each frame and inactive periods between the active periods, wherein the switching circuit generates an output video signal including at least two color components by inserting the test signal into the at least two color components of the input video signal during predetermined time periods falling within the inactive periods of the color components of the input video signal; and a transmission circuit for outputting the output video signal including the at least two color components and sync signals from the video source to the transmission cable system.

The receiving-side circuit includes a receiving circuit for receiving the video signal transmitted by the transmission cable system including the at least two color components, each color component containing the test signal inserted therein; a delay line circuit coupled to the receiving circuit for delaying the at least two color components of the transmitted video signal relative to one another to generate a delay-compensated video signal having at least two color components, the delay line circuit further detecting relative delays among the test signals contained in the at least two color components of the delay-compensated video signal and generating detect signals which represent the relative delays; a control circuit coupled to the delay line circuit, the control circuit receiving the detect signals and generating delay control signals based on the detect signals, wherein the delay line circuit receives the delay control signals, and delays the at least two color components of the transmitted video signal relative to one another based on the delay control signals; and a filter circuit receiving the delay-compensated video signal from the delay line circuit and removing the test signal from the delay-compensated video signal.

In another aspect, the present invention provides a method for detecting and compensating for skew in a video signal transmitted by a cable system. The method includes, at a transmission side, (a) receiving an input video signal from a video source, the input video signal including at least two color components, each color component including an active period within each frame and inactive periods between the active periods; (b) generating a test signal; (c) generating an output video signal including at least two color components by inserting the test signal into the at least two color components of the input video signal during predetermined time periods falling within the inactive periods of the color components of the input video signal; and (d) outputting the output video signal including the at least two color components and sync signals from the video source to a transmission cable system.

The method also includes, at a receiving side, (e) receiving the video signal transmitted by the transmission cable system including the at least two color components, each color component containing the test signal inserted therein; (f) delaying the at least two color components of the transmitted video signal relative to one another to generate a delay-compensated video signal having at least two color components; (g) detecting relative delays among the test signals contained in the at least two color components of the delay-compensated video signal to generate detect signals which represent the relative delays; (h) generating delay control signals based on the detect signals, wherein in step (f) the at least two color components are delayed relative to one another based on the delay control signals; and (i) removing the test signal from the delay-compensated video signal.

In another aspect, the present invention provides a method for detecting and compensating for skew in a video signal transmitted by a cable system, the cable system including at least three conductors, which includes: inserting a test pulse signal into a video signal, the video signal including at least two color components, each color component including an active period within each frame and inactive periods between the active periods, wherein the test pulse signal is inserted into each color component during predetermined time periods falling within the inactive periods of the color components; transmitting the video signal having at least two color components with the inserted test pulse signal over the cable system, each color component of the video signal being carried by one conductor of the cable; after transmission, delaying at least one of the color components relative to at least another one of the color components to generate delay-compensated video signals, wherein pulses in the test pulse signals contained in the at least two color components are synchronized with each other; and removing the test pulse signal from the color components.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

According to embodiments of the present invention, test signal and normal video signal are transmitted concurrently over the transmission cable. Test signals for skew detection and compensation are transmitted within predetermined time periods where the RGB components of the normal video single are inactive. In one particular embodiment, the test signals are transmitted with a time period in each frame that occur after the vertical synchronization (V sync) signals (or an H+V composite sync signals if a system uses such sync signals) end and before the active RGB signals begin.

Figure 1:
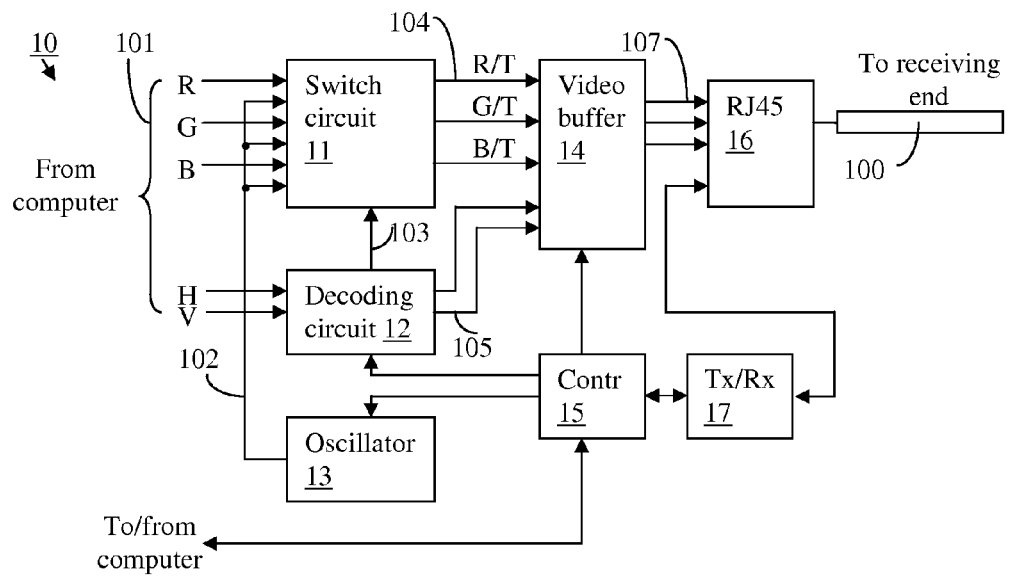
FIG. 1 illustrates transmission-side circuit in a skew detection and compensation system according to an embodiment of the present invention.

FIG. 1 illustrates a transmission-side circuit 10 located at the upstream end of the transmission cable 100. The transmission-side circuit may be located in, for example, a computer-side extender device in a KVM (keyboard, video, mouse) switch system, in the KVM switch, etc.

The transmission-side circuit 10 includes a switching circuit 11, a decoding circuit 12, a test signal generating circuit 13, a video buffer 14, and a control circuit 15. A source (input) video signal 101, which includes R, G, B signals and H sync and V sync signals, is received from a computer. The R, G, and B signals of the source video signal 101 are inputted to the switching circuit 11. A test signal 102, generated by the test signal generating circuit 13 (such as an oscillator), is also inputted to the switching circuit 11. The H sync and V sync signals of the source video signal 101 are inputted to the decoding circuit 12, which generates a switching control signal 103 based on these sync (synchronization) signals. The switching circuit 11 is a multiplexer which selects either the R, G, and B signals from the source video signal 101 or the test signals 102 based on the switching control signal 103. The switching circuit 11 may be implemented by three two-to-one switches. Thus, the three output signals 104 of the switching circuit 11 is either the respective R, G, B signal from the source video signal 101 or the test signals (pulse signals) 102. The switching control signal 103 controls the switching circuit 11 such that the test signals 102 are selected during a predetermined time period falling within an inactive period of the video signal 101. As described in more detail later with reference to FIG. 3, each color component of the video signal 101 includes active periods (one active period in each frame) where data represented by the video signal is present, and inactive periods between the active periods. The test signals 102 can be added either after the V sync signal ends and before the active period starts (in the video art, this time period is commonly called Back Porch and Top/Left Border), or after the active period ends and before the next V sync signal starts (in the video art, this time period is called Bottom/Right Border and Front Porch). The test signals 102 can be considered as being added periodically in the sense that it is added to a predetermined time period each frame. In one example, the test signal is added during a period within 300 μs after the V sync signal ends, which is before active video signals start. As a result of adding the test signal during the inactive periods, the test signal does not interfere with the RGB video signals.

The test signal 102 is a pulse signal having a suitable frequency and a suitable duty cycle. In a preferred embodiment, the frequency is 2 MHz and the duty cycle is 1:1. Other frequencies such as 4 MHz, 6 MHz, 8 MHz, etc. may also be used. The frequency and duty cycle may be chosen based on the length of the cable for which signal compensation is desired so as to ensure a pulse overlap for a given signal delay caused by a given cable length. For example, a 1000 feet cable may cause relative signal delays up to approximately 130 ns. Thus, using the above exemplary test signal, which has a pulse width of 250 ns, will ensure pulse overlap even at the maximum delay. A frequency lower than 2 MHz can also be used in this example.

The output signals 104 are inputted to the video buffer 14. The decoding circuit 12 additionally generates processed H and V sync signals 105 which are inputted into the video buffer 14. The processed H and V sync signals 105 are similar to the source H and V sync signals but may have a different form. For example, the processed H and V sync signals 105 may be composite sync signals, whereas the unprocessed H and V sync signals are non-composite sync signals. Alternatively, the processed H and V sync signals may be the same as the source H and V sync signals. In a preferred embodiment, the video buffer 14 is a differential twisted-pair driver, which may be implemented by an operational amplifier, which converts the RGB signals into differential signals 107 for transmission over the cable 100. In addition, the video buffer 14 combines the H and V sync signals 105 from the decoding circuit 12 with the RGB video signals.

Figure 3:
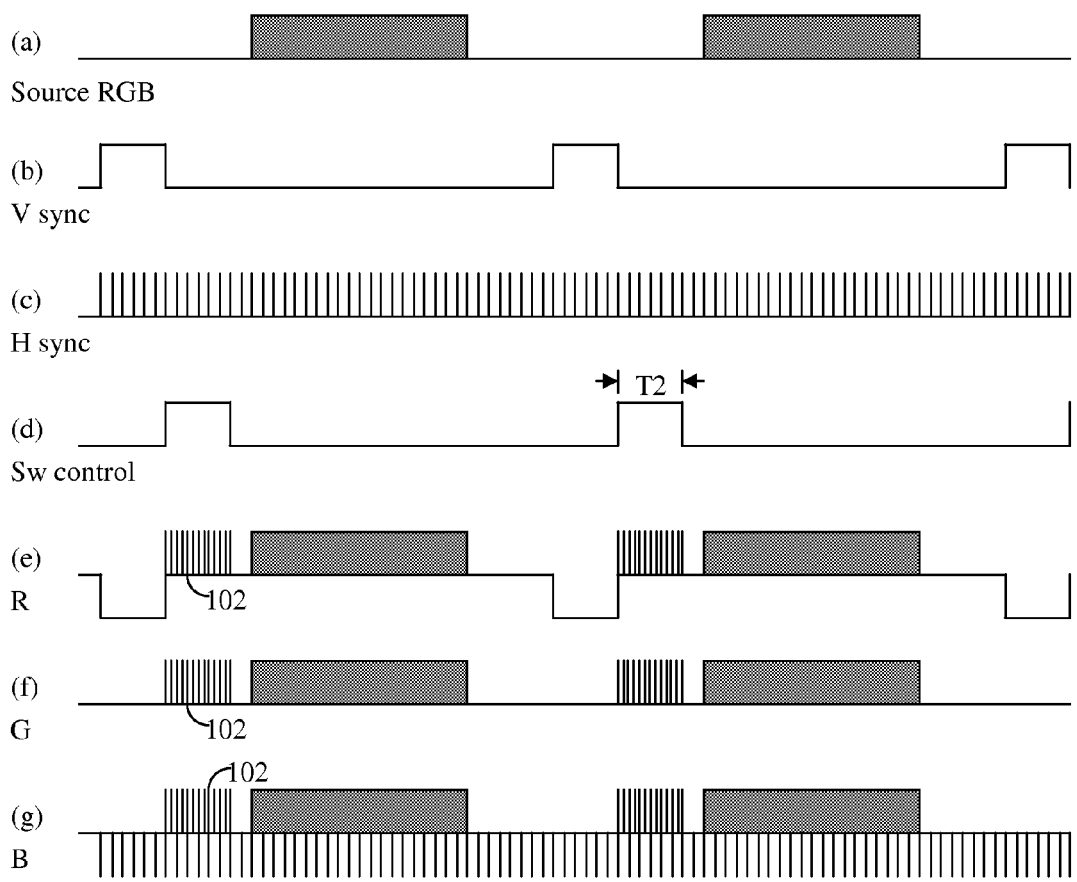
FIG. 3 is a schematic timing diagram illustrating the various signals according to an embodiment of the present invention.

FIG. 3 a schematic timing diagram illustrating the various signals. The waveform (a) represents the R (or G or B) signal of the source signal 101. These signals have an active period during each video frame, and an inactive period between the active periods. The waveforms (b) and (c) represent the V sync and H sync signals of the source signal 101, respectively. The V sync signal is active during the inactive period of the RGB signals. A frame is a time period defined by two consecutive V sync signals. The waveform (d) represents the switching control signal 103 generated by the decoding circuit 12. The switching control signal is active during a time period T2 which starts after the V sync signal ends (i.e. the falling edge of the V sync signal) and before the active RGB video signal begins. In the examples shown in FIG. 3, the time period T2 starts immediately after the V sync signal ends. The waveforms (e), (f) and (g) represent the positive end of the differential RGB signals 107 outputted by the video buffer 14 of FIG. 1. The negative end of the differential RGB signals 107 are the opposite of the positive end and are not shown in FIG. 3. In this particular example, the H sync signal is transmitted with the B signal (see waveform (g)) and the V sync signal is transmitted with the R signal (see waveform (e)). Each of the RGB signals (e), (f) and (g) has the test signal 102 within the time period T2 of the switching control signal. The RGB signals 107 outputted by the video buffer 14 of FIG. 1 may be referred to as mixed RGB signals because they have the various other signals mixed with the RGB video signals.

The example in FIG. 3 uses separate H and V sync signals; H+V composite sync signals may be treated in an appropriate manner.

Referring back to FIG. 1, the mixed RGB signals 107 generated by the video buffer 14 is outputted via a connector 16 (such as an RJ45 connector) to the cable 100. The cable 100 includes multiple wires for transmitting the mixed R, G and B video signals. For example, the cable 100 may be a Cat 5 cable which includes four pairs of twisted wires for transmitting differential signals, three of which may be used to transmit the mixed R, G and B signals, respectively. The cable 100 may be up to 150 meters, 300 meters long or longer.

The control circuit 15 is connected to and controls the operations of the decoding circuit 12, the test signal generating circuit 13 and the video buffer 14. If the transmission-side circuit is used in a KVM switch system or a KVM extender system, the cable 100 additionally carries keyboard and/or mouse signals (e.g., on a fourth pair or twisted wires of the cable), and the transmission-side circuit is additionally connected to the keyboard and mouse connectors of the computer. In the example shown in FIG. 1, the control circuit 15 performs the function of processing the keyboard and/or mouse signals received from a user console device via the cable 100, and transmits the processed keyboard and/or mouse signals to the computer. The control circuit 15 also receives and processes other signals from the computer (such as keyboard or mouse related signals, audio signals, USB virtual media signals, etc.) and inputs them to the cable 100 (e.g. on the fourth pair of twisted wires of the cable). A transceiver 17 (such as an RS485 transceiver) is provided between the control circuit 15 and the connected 16 to convert the signals between differential signals carried by the cable 100 and single-end (non-differential) signals. The keyboard/mouse signal processing functions of the control circuit 15 and the transceiver 17 are optional and are not essential to the video signal compensation function of the transmission-side circuit.

Each of the switching circuit 11, the decoding circuit 12, the test signal generating circuit 13 and the video buffer 14 may be implemented by an ASIC, FPGA, CPLD or other suitable hardware. Various circuits can also be combined into a single chip. For example, a chip Spartan3e100 or Spartan3e250 made by Xilinx Co may be used to implement the decoding circuit 12 and the test signal generating circuit 13, a chip QS3527 made by IDT may be used to implement the switching circuit 11, and a chip EL5378 made by Intersil may be used to implement the video buffer 14. The test signal generating circuit 13 may also be implemented by a simple stand-alone oscillator circuit.

Figure 2:
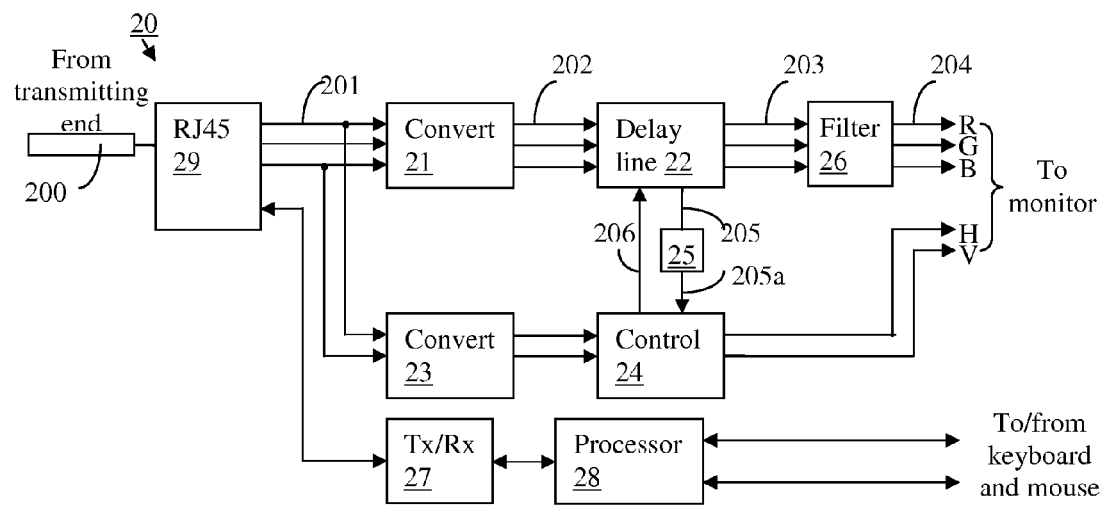
FIG. 2 illustrates receiving-side circuit in a skew detection and compensation system according to an embodiment of the present invention.

FIG. 2 illustrates a receiving-side circuit 20 at the receiving end of a cable 200. The receiving-side circuit may be located in, for example, a console-side extender device in a KVM switch system. The cable 200 may be the same physical cable in as cable 100 in FIG. 1; alternatively, they may be different cables, in which case an extender, a KVM switch, or other devices or cables may be connected between the cables 100 and 200. In the latter configuration, the skew at the receiving end of the cable 200 will be the total skew caused by all of the cables (which may be referred to as a cable system) between the connectors 16 and 29.

The receiving-side circuit 20 includes differential to single-end converter circuits 21 and 23, a delay line circuit 22, a control circuit 24, and a comparator circuit 25 coupled between the delay line and the control circuit 24. The input mixed RGB signals 201 from the cable 200, in the form of differential signals, are converted into single-end mixed RGB signals 202 by the first differential to single-end signal converter 21. The signals 201 and 202 contain the test pulse signals 102 mixed with the RGB signals. The converted RGB signals 202 are inputted to the delay line 22. Two of the three input differential color signals 201 that have the V sync and H sync signals mixed with them are also inputted to the second differential to single-end signal converter circuit 23, which extracts and converts the V and H sync signals from the input mixed RGB signals 201 and outputs them to the control circuit 24. As described in more detail below, the delay line 22 and the control circuit 24 cooperate with each other to perform delay compensation to generate delay-compensated RGB signals 203 and to detect the amount of relative delay in the delay-compensated RGB signals. It should be noted that the amount of relative delay should always be less than the period of the pulses in the test signals 102; the skew compensation will not be adequate if the transmission cables are so long as to generate relative delays greater than the period of the pulses. The delay-compensated RGB signals 203 are filtered by a filter circuit 26 (such as a multiplexer) to remove the test signals mixed therein. The RGB signals 204 outputted by the filter circuit 26, along with processed H sync and V sync signals outputted by the control circuit 24 (which may have the same or a different form as the sync signals inputted to the control circuit 24), are inputted to a display device, such as a monitor of a user console, to be displayed.

If the receiving-side circuit 20 is used in a KVM switch system or a KVM extender system, the cable 200 additionally carries keyboard and/or mouse signals (e.g., on a fourth pair or twisted wires of the cable), and the receiving-side circuit is additionally connected to a keyboard and a mouse of the user console via a connector such as a PS/2 or USB connector. As shown in FIG. 2, the keyboard and/or mouse signal from the keyboard and mouse are processed by a processor 28. A transceiver 27 (such as an RS485 transceiver) is provided between the processor 28 and the connecter 29 to convert the signals between single-end (non-differential) signals and differential signals carried by the cable 200. The transceiver 27 and the processor 28 are optional and are not essential to the video signal compensation function of the transmission-side circuit.

Figure 4:
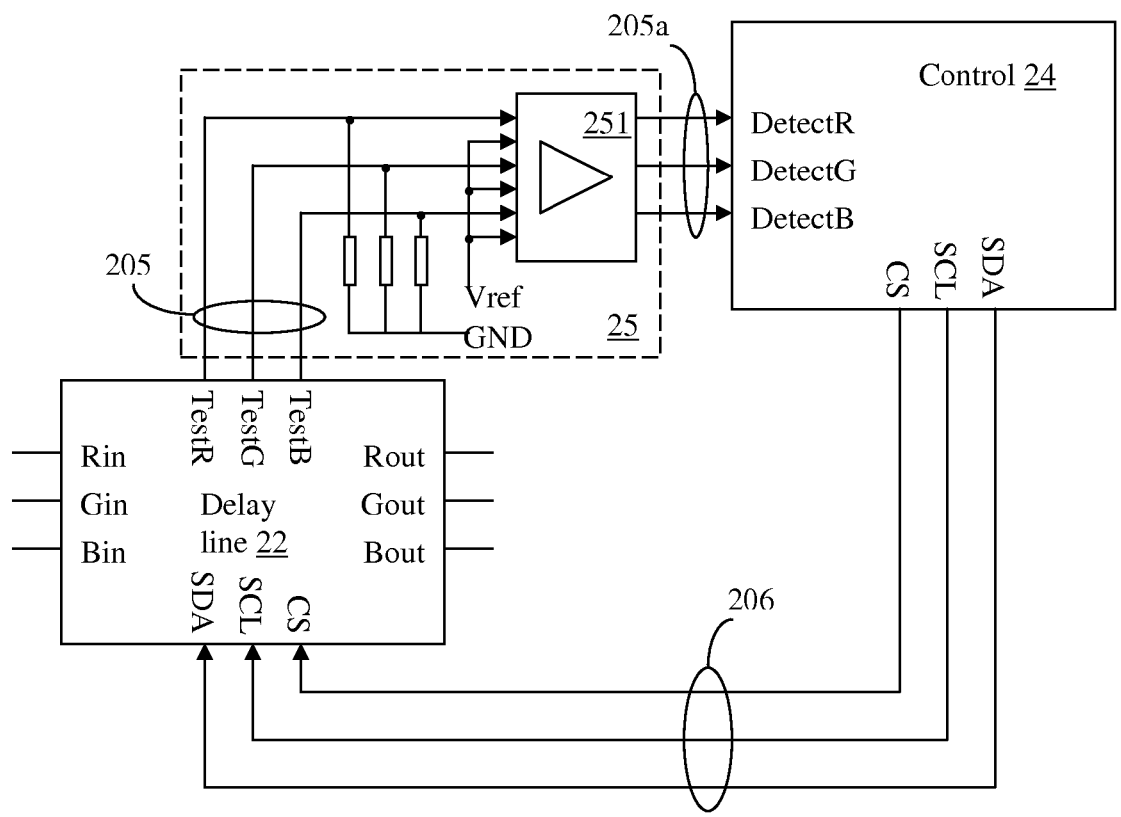
FIG. 4 illustrates the delay line, the control circuit and the comparator circuit in the receiving-side circuit of FIG. 2.

FIG. 4 illustrates the connections among the delay line 22, the control circuit 24 and the comparator circuit 25 in more detail. The delay line 22 receives input RGB signals (at pins Rin, Gin, Bin in this example) and delays the RGB signals relative to each other based on control signals 206 received from the control circuit 24 (at pins SDA (data), SCL (clock), and CS (enable) in this example) to generate output RGB signals (at pins Rout, Gout, Bout in this example). The delay line 22 also generates detect signals 205 (at pins TestR, TestG, TestB in this example), which represent the amount of relative delay among the output (delay-compensated) R, G and B signals. The detect signals 205 are generated by detecting the relative delays among the test pulse signals contained in the output R, G, B signals.

A number of chips are commercially available for implementing the delay line 22, such as chips EL9115 and ISL59920 made by Intersil Americas Inc. The detailed structure and operation principles of the delay line 22 is not described here as they are known to those skilled in the relevant art and are described in available product literature.

In a preferred embodiment, each detect signal 205 (at TestR, TestG or TestB) is a pulse signal; its pulse frequency is the same as the frequency of the test signal 102 contained in the input R, G, B signals, and its polarity and pulse width are determined by the relative delay between the test signal pulses in the input R and G signal, or the G and B signals, or the B and R signals, respectively. For example, if the test pulses in the input R signal lead the test pulses in the input G signal by 5 ns, the TestR signal will have positive pulses having a pulse width of 5 ns; if the test pulses in the input R signals lag the test pulses in the input G signal by 3 ns, the TestR signal will have negative pulses having a pulse width of 3 ns.

As illustrated in FIG. 4, the comparator circuit 25 converts the detect signals 205 as current signals to detect signals 205a as logic (voltage) signals. It includes a chip 251 having three comparators. The detect signal at TestR from the delay line 22 is converted from a current pulse signals to a slow-varying voltage signal by a resistor circuit, and inputted to a first input of the first comparator of the chip 251. The second input of the first comparator is connected to a reference voltage, which is zero in the preferred embodiment. The output of the first comparator is 1 if the voltage signal is greater than the reference voltage, and 0 if the voltage signal is less than or equal to the reference voltage. The comparator circuits between the TestG and DetectG pins and between the TestB and DetectB pins are similar. The output signals 205a of the comparator circuit 25 (i.e. detect signals in a logic (voltage) form) are inputted to the control circuit 24 (at pins DetectR, DetectG, DetectB in this example).

As a result, the signal inputted to the DetectR pin of the control circuit 24 is 1 if the input R signal leads the input G signal, and is 0 if the input R signal is synchronized with or lags the input G signal; the signal inputted to the DetectG pin is 1 if the input G signal leads the input B signal, and is 0 if the input G signal is synchronized with or lags the input B signal; and the signal inputted to the DetectB pin is 1 if the input B signal leads the input R signal, and is 0 if the input B signal is synchronized with or lags the input R signal.

Based on the detect signals 205a received from the delay line via the comparator circuit 25, the control circuit 24 generates delay control signals 206 (at pins CS, SCL and SDA in this example) for the delay line 22. The control circuit 24 may be implemented as an FPGA, CPLD, ASIC or other suitable hardware and software structures.

Figure 5A:
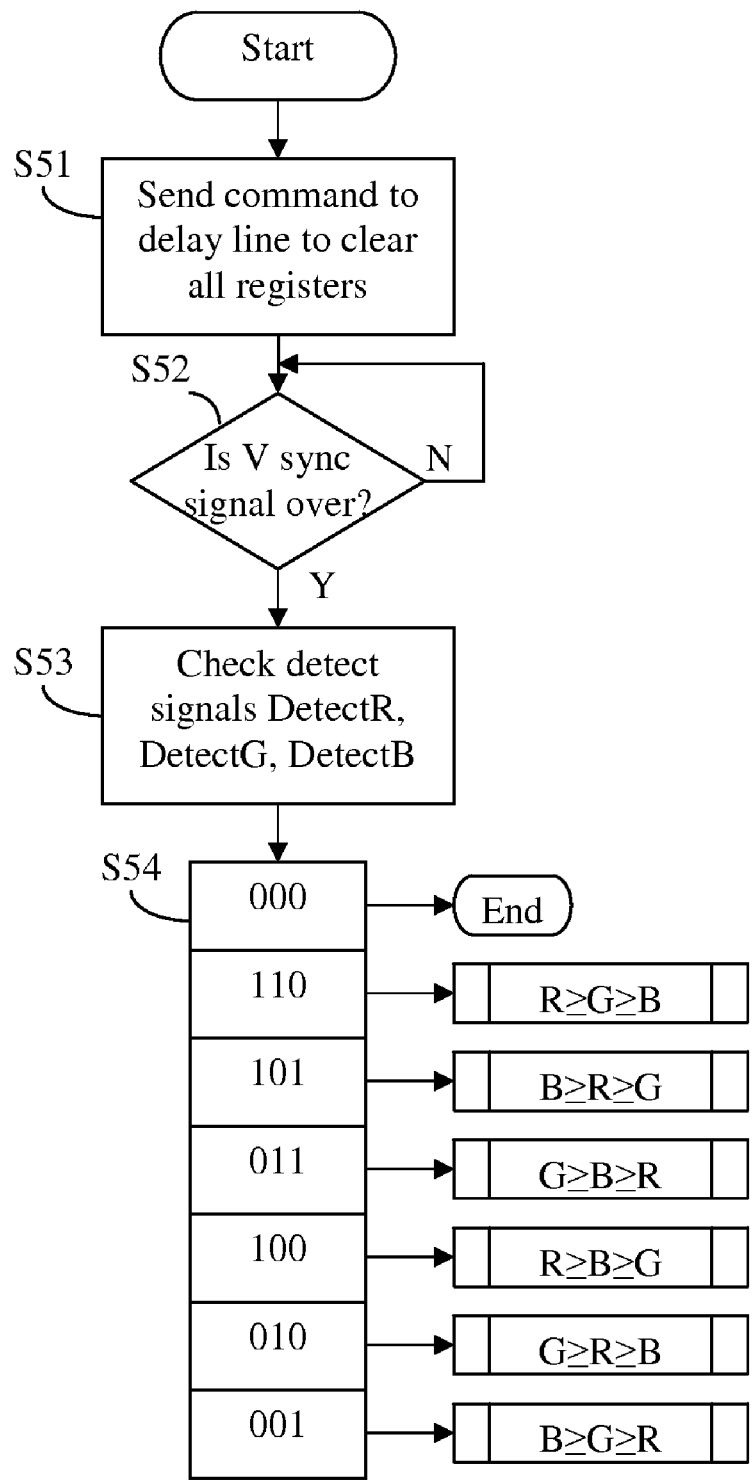
FIGS. 5(a) and 5(b) are flow charts illustrating the operations of the control circuit for generating the control signals based on the detect signals according to an embodiment of the present invention.
Figure 5B:
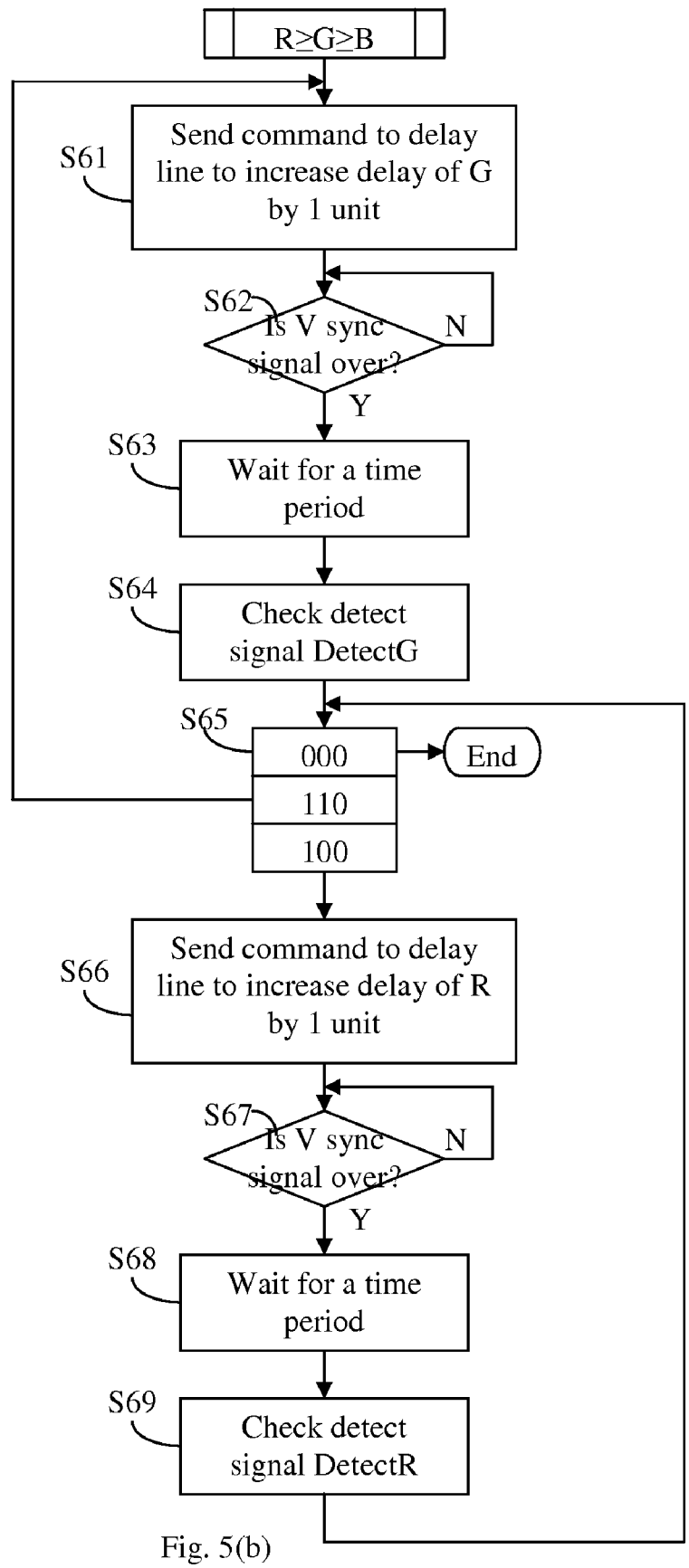

FIGS. 5(a) and 5(b) are flow charts illustrating the operations of the control circuit 24 for generating the delay control signals 206 based on the detect signals 205. The skew detection process shown in FIGS. 5(a) and 5(b) is performed once every time a new cable is connected to the receiving-side circuit, for example, when a computer is switched to the user console in a KVM switch system, when a new cable is connected to a display, etc. After the process starts, the control circuit 24 sends a control signal to the delay line 22 to clear all of its registers so a new delay compensation process can be performed (step S51). The registers of the delay lines 22 store the values used to delay the input RGB signals. The control circuit 24 then waits for the V sync signal to end (e.g. be detecting the falling edge of the V sync signal) (step S52). After the V sync signal is over, the control circuit 24 checks the detect signals DetectR, DetectG and DetectB (step S53). Then, depending on the detect signals 205, it either ends or performs one of six routines. For example, if the detect signals 205 are 000, then it means the input RGB signals to the delay line 22 are synchronized (i.e. have no detectible relative delays), and the process ends. If the detect signals 205 are 100, then it means R>B, G≦B and B≦R, i.e., R≧G≧B (here, ">" means leading, "≦" means lagging or is synchronized with, etc.) In this case, the control circuit 24 will executes a routine labeled "R≧G≧B" in FIG. 5(*a*). The other five cases can be derived similarly.

FIG. 5(*b*) illustrates the process "R≧G≧B"; the other processes are similar except the relative relationships of the three color singles are different. In the case of "R≧G≧B", because both the R and G signals lead the B signal, the control circuit 24 will cause the delay line 22 to progressively increase the delay of G and R signals until they are synchronized with the B signal. As shown in FIG. 5(*b*), after the routine starts, the control circuit 24 first sends a control signal to the delay line 22 to increase the delay of the G signal by 1 unit, such as 2 ns (the minimum detectable delay amount) in a preferred embodiment (step S61). The control circuit 24 then waits for the V sync signal to be over (step S62), and wait for a predetermined time period (step S63). The purpose of the wait is to allow the delay line to act and to allow the detect signals 205 to stabilize.

The control circuit 24 then checks the detect signal DetectG (step S64). Because the starting condition for this routine is "R≧G≧B", and the delay of the G signal has been increased, at this point the G signal will either be synchronized with B or will still lead B. Thus, the result of the checking will be 000 (RGB signals synchronized), 110 (R≧G≧B) or 100 (R≧B≧G, indicating B=G). The control circuit 24 determines how to proceed based on the checking result (step S65). If the checking result is 000, the process ends. If the checking result is 110, the control circuit 24 repeats steps S61-S64 to further increase the delay of the G signal. If the checking result is 100, the control circuit 24 sends a control signal to the delay line 22 to increase the delay of the R signal by 1 unit (step S66). The control circuit 24 then waits for the V sync signal to be over (step S67) and wait for a predetermined time period (step S68). The control circuit 24 then checks the detect signal DetectR (step S69), and goes back to step S65. At this point, if the checking result is 100 (i.e. R still leads G and B), steps S66-S69 are repeated. The process ends if all RGB signals are synchronized (000).

After the skew detection process ends, the parameters that control the delay amounts are stored in the delay line 22 (e.g. in the registers), and the delay line continues to perform skew compensation for the input video signal using these parameters.

In one embodiment of the present invention, the test signal is inserted into the video signal and transmitted by the transmission-side circuit continuously, regardless of whether a skew detection and compensation operation is being performed.

Although in the illustrated embodiment the test signal is transmitted in every video frame, it is also possible to transmit the test signal in selected ones but not all video frames.

Although in the illustrated embodiment the V sync and H sync signals of the video signal are transmitted with two of the color signals, the sync signals may also be transmitted separately.

Although in the illustrated embodiment three detect signals are generated by the delay line, it is possible to use only two detect signals because the third delay amount is not independent of the first two delay amounts.

Although in the illustrated embodiments the RGB (analog) signals are used as examples of color components of video signals, the color components may also be in other forms, such as YUV (analog signals), YCbCr (digital signals), etc.

The term "color components" as used in this disclosure should be understood to broadly mean video components regardless of their forms. Also, although the video signals are said to carry images, the images may be blank images (e.g. white or black screens).

Figure 6:
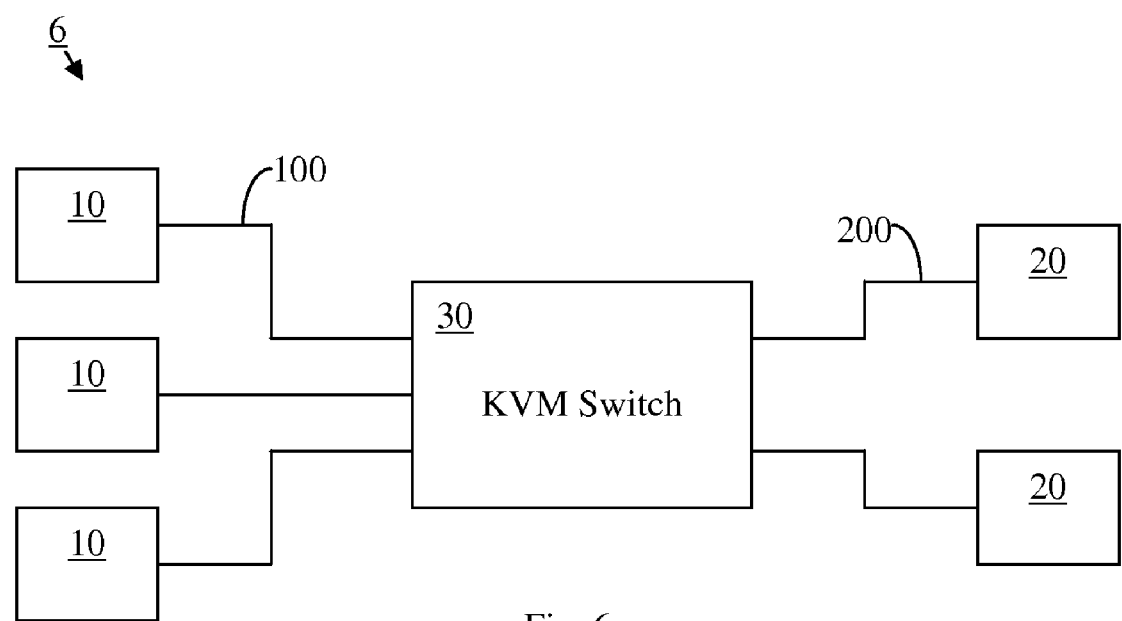
FIG. 6 illustrates a KVM (keyboard, video, mouse) switch system implementing the skew detection and compensation system according to an embodiment of the present invention.

The video signal compensation method and apparatus described herein may be applied in a variety of systems where video signals are transmitted over cables, such as remote broadcast systems, video surveillance systems, video extender systems, KVM systems including matrix KVM switches and KVM extenders, etc. FIG. 6 illustrates a KVM systems 6 including a KVM switch 30 connected to a plurality of transmission-side circuits 10 of FIG. 1 by a cables 100 and to one or more receiving-side circuits 20 of FIG. 2 by cables 200. Each transmission-side circuit 10 may be connected to a computer (not shown) as a video source, and each receiving-side circuit 20 may be connected to a monitor of a user console (not shown). The KVM switch 30 may be a conventional KVM switch that includes a switching circuit for switching user input signals (e.g. keyboard and mouse signals) from a selected user console to a selected computer and switching video signals from the selected computer to the selected user console. The structure of a KVM switch 30 is generally known in the art and is not described in detail here.

It will be apparent to those skilled in the art that various modification and variations can be made in the skew detection and compensation method and apparatus of the present invention without departing from the spirit or scope of the invention. Thus, it is intended that the present invention cover modifications and variations that come within the scope of the appended claims and their equivalents.

What is claimed is:

1. A video signal skew detection and compensation system, comprising:

a transmission-side circuit coupled to a transmission cable system, comprising:

a test signal generating circuit for generating a test signal;

a switching circuit receiving the test signal and receiving an input video signal from a video source, the input video signal including at least two color components, each color component including an active period within each frame and inactive periods between the active periods, wherein the switching circuit generates an output video signal including at least two color components by inserting the test signal into the at least two color components of the input video signal during predetermined time periods falling within the inactive periods of the color components of the input video signal; and a transmission circuit for outputting the output video signal including the at least two color components and sync signals from the video source to the transmission cable system.

2. The system of claim 1, wherein the transmission-side circuit further comprises a decoding circuit receiving the sync signals from the video source and generating a control signal based on a vertical sync signal of the sync signal, wherein the switching circuit receives the control signal and inserts the test signal into the at least two color components of the input video signal according to the control signal.

3. The system of claim 2, wherein the transmission circuit includes a video buffer circuit which combines the output video signal and the sync signals and converts the combined signals into multiple component differential signals.

4. The system of claim 1, wherein the test signal generating circuit is an oscillator circuit, and wherein the test signal is a pulse signal.

5. The system of claim 1, wherein the predetermined period starts after the vertical sync signal and before the active period of the color components.

6. The system of claim 1, wherein the test signal is inserted into the color components of the input video signal during each frame.

7. The system of claim 1, further comprising:
a receiving-side circuit coupled to the transmission cable system, comprising:
a receiving circuit for receiving the video signal transmitted by the transmission cable system including the at least two color components, each color component containing the test signal inserted therein;
a delay line circuit coupled to the receiving circuit for delaying the at least two color components of the transmitted video signal relative to one another to generate a delay-compensated video signal having at least two color components, the delay line circuit further detecting relative delays among the test signals contained in the at least two color components of the delay-compensated video signal and generating detect signals which represent the relative delays;
a control circuit coupled to the delay line circuit, the control circuit receiving the detect signals and generating delay control signals based on the detect signals, wherein the delay line circuit receives the delay control signals, and delays the at least two color components of the transmitted video signal relative to one another based on the delay control signals; and
a filter circuit receiving the delay-compensated video signal from the delay line circuit and removing the test signal from the delay-compensated video signal.

8. The system of claim 7,
wherein the detect signals generated by the delay line circuit is a pulse signal having pulse widths and polarities that represent the amount and direction of relative delays among the at least two color components, and
wherein the receiving-side circuit further comprise a comparator circuit coupled between the delay line circuit and the control circuit, the comparator circuit converting the detect signals generated by the delay line circuit from current signals into logic signals indicating which color components lead which other color components, and inputting the logic signals to the control circuit.

9. The system of claim 7, wherein if the detect signals indicate that a first one of the at least two color components leads a second one of the at least two color components, the control circuit generates a first delay control signal for the delay line circuit to delay the first color component by an additional amount.

10. A method for detecting and compensating for skew in a video signal transmitted by a cable system, comprising, at a transmission side:
(a) receiving an input video signal from a video source, the input video signal including at least two color components, each color component including an active period within each frame and inactive periods between the active periods;
(b) generating a test signal;
(c) generating an output video signal including at least two color components by inserting the test signal into the at least two color components of the input video signal during predetermined time periods falling within the inactive periods of the color components of the input video signal; and
(d) outputting the output video signal including the at least two color components and sync signals from the video source to a transmission cable system.

11. The method of claim 10, further comprising, at the transmission side:
(e) generating a control signal based on a vertical sync signal of the sync signal from the video source,
wherein in step (c), the test signal is inserted into the at least two color components of the input video signal according to the control signal.

12. The method of claim 11, wherein step (d) includes combining the output video signal and the sync signals and converting the combined signal into multiple component differential signals.

13. The method of claim 10, wherein the test signal is a pulse signal.

14. The method of claim 10, wherein the predetermined period starts after the vertical sync signal and before the active period of the color components.

15. The method of claim 10, wherein the test signal is inserted into the color components of the input video signal during each frame.

16. The method of claim 10, further comprising, at a receiving side:
(e) receiving the video signal transmitted by the transmission cable system including the at least two color components, each color component containing the test signal inserted therein;
(f) delaying the at least two color components of the transmitted video signal relative to one another to generate a delay-compensated video signal having at least two color components;
(g) detecting relative delays among the test signals contained in the at least two color components of the delay-compensated video signal to generate detect signals which represent the relative delays;
(h) generating delay control signals based on the detect signals,
wherein in step (f) the at least two color components are delayed relative to one another based on the delay control signals; and
(i) removing the test signal from the delay-compensated video signal.

17. The method of claim 16,
wherein the detect signals is a pulse signal having pulse widths and polarities that represent the amount of relative delays among the at least two color components;
the method further comprising, at the receiving side, converting the detect signals from current signals into logic signals indicating which color components lead which other color components;
wherein in step (h) the delay control signals are generated based on the logic signals.

18. The method of claim 16, wherein step (h) includes:
(h1) if the detect signals indicate that a first one of the at least two color components leads a second one of the at least two color components, generating a first delay control signal to delay the first color component by an additional amount.

19. The method of claim 16, wherein the at least two color components include a first, a second and a third color components, and wherein step (h) includes:

if the detect signals indicate that the first color component leads the second color component and the second color component leads the third color component, (h1) generating a first delay control signal to delay the second color component by an additional amount;

(h2) detecting the detect signals to determine whether the second color component leads the third color component;

if in step (h2) the second color component leads the third color component, repeating steps (h1) and (h2);

if in step (h2) the second color component does not lead the third color component, (h3) generating a second delay control signal to delay the first color component by an additional amount;

(h4) detecting the detect signals to determine whether the first color component leads the second color component;

if in step (h4) the first color component leads the second color component, repeating steps (h3) and (h4); and if in step (h4) the first color component leads the second color component, exiting the process.

20. A method for detecting and compensating for skew in a video signal transmitted by a cable system, the cable system including at least three conductors, comprising:

inserting a test pulse signal into a video signal, the video signal including at least two color components, each color component including an active period within each frame and inactive periods between the active periods, wherein the test pulse signal is inserted into each color component during predetermined time periods falling within the inactive periods of the color components;

transmitting the video signal having at least two color components with the inserted test pulse signal over the cable system, each color component of the video signal being carried by one conductor of the cable;

after transmission, delaying at least one of the color components relative to at least another one of the color components to generate delay-compensated video signals, wherein pulses in the test pulse signals contained in the at least two color components are synchronized with each other; and removing the test pulse signal from the color components.

21. A KVM (keyboard, video, mouse) switch system comprising:

a KVM switch;

a plurality of transmission-side circuits each for connecting to a computer;

one or more receiving-side circuits each for connecting to a monitor of a user console;

a plurality of first cables connecting the transmission-side circuits to the KVM switch; and a plurality of second cables connecting the receiving-side circuits to the KVM switch;

wherein the KVM includes a switching circuit for switching user input signals from a selected user console to a selected computer and switching video signals from the selected computer to the selected user console, wherein each transmission-side circuit comprises:

a test signal generating circuit for generating a test signal;

a switching circuit receiving the test signal and receiving an input video signal from a video source, the input video signal including at least two color components, each color component including an active period within each frame and inactive periods between the active periods, wherein the switching circuit generates an output video signal including at least two color components by inserting the test signal into the at least two color components of the input video signal during predetermined time periods falling within the inactive periods of the color components of the input video signal; and a transmission circuit for outputting the output video signal including the at least two color components and sync signals from the video source to the first cable, and wherein the receiving-side circuit comprises:

a receiving circuit for receiving the video signal transmitted by the second cable including the at least two color components, each color component containing the test signal inserted therein;

a delay line circuit coupled to the receiving circuit for delaying the at least two color components of the transmitted video signal relative to one another to generate a delay-compensated video signal having at least two color components, the delay line circuit further detecting relative delays among the test signals contained in the at least two color components of the delay-compensated video signal and generating detect signals which represent the relative delays;

a control circuit coupled to the delay line circuit, the control circuit receiving the detect signals and generating delay control signals based on the detect signals, wherein the delay line circuit receives the delay control signals, and delays the at least two color components of the transmitted video signal relative to one another based on the delay control signals; and a filter circuit receiving the delay-compensated video signal from the delay line circuit and removing the test signal from the delay-compensated video signal.

* * * * *